United States Patent [19]

Betton et al.

[11] Patent Number: 5,200,877
[45] Date of Patent: Apr. 6, 1993

[54] BATTERY PROTECTION SYSTEM

[75] Inventors: Arnold L. Betton, Kings Beach; Edgar A. Hirzel, Granada Hills, both of Calif.

[73] Assignee: Baton Labs, Inc., Granada Hills, Calif.

[21] Appl. No.: 679,535

[22] Filed: Apr. 2, 1991

Related U.S. Application Data

[63] Continuation-in-part of Ser. No. 504,238, Apr. 4, 1990, abandoned.

[51] Int. Cl.$^5$ .............................................. H02H 3/24
[52] U.S. Cl. ........................................ 361/92; 320/13; 307/10.7
[58] Field of Search ................ 361/18, 86, 92; 307/10.6, 10.7, 130; 324/636; 320/13, 40; 180/287

[56] References Cited

U.S. PATENT DOCUMENTS

| | | | |
|---|---|---|---|
| 2,709,725 | 5/1955 | Bieber et al. | 200/4 |
| 2,864,912 | 12/1958 | Schmidt | 335/69 |
| 2,870,288 | 1/1959 | Schmidt | 335/69 |
| 3,127,518 | 3/1964 | Pruit . | |
| 3,171,920 | 3/1965 | Klein et al. | 335/69 |
| 3,172,400 | 3/1965 | Hale . | |
| 3,395,288 | 7/1968 | Von Brimer . | |
| 3,462,647 | 8/1969 | Russell . | |
| 3,474,296 | 10/1969 | Rickey . | |
| 3,497,707 | 2/1970 | Stewart . | |
| 3,646,354 | 2/1972 | Von Brimer | 307/10 BP |
| 3,668,514 | 6/1972 | Peck | 322/28 |
| 3,763,415 | 10/1973 | Ownby | 320/6 |
| 3,829,753 | 8/1974 | Marshall | 320/6 |
| 3,852,732 | 12/1974 | Yorksie et al. | 340/249 |
| 3,967,133 | 6/1976 | Bokern | 307/10 R |
| 4,017,724 | 4/1977 | Finger | 235/151.31 |
| 4,052,717 | 10/1977 | Arnold et al. | 340/249 |
| 4,088,940 | 5/1978 | Ciarniello et al. | 322/8 |
| 4,090,122 | 5/1978 | Hoinski | 320/6 |
| 4,127,782 | 11/1978 | Omura et al. | 307/10 R |
| 4,137,557 | 1/1979 | Ciarniello et al. | 361/92 |
| 4,149,093 | 4/1979 | D'Alessio et al. | 307/10 BP |
| 4,153,869 | 5/1979 | Ragaly | 322/90 |
| 4,161,684 | 7/1979 | Ragaly | 322/90 |
| 4,180,770 | 12/1979 | Eby | 324/429 |
| 4,193,026 | 3/1980 | Finger et al. | 324/428 |
| 4,258,305 | 3/1981 | Anglin | 320/2 |
| 4,282,475 | 8/1981 | Milton | 320/6 |
| 4,357,505 | 11/1982 | Bridges | 200/48 KB |
| 4,365,188 | 12/1982 | Walter | 318/282 |
| 4,388,618 | 6/1983 | Finger | 340/636 |
| 4,444,067 | 4/1984 | Preuss et al. | 74/108 |
| 4,445,090 | 4/1984 | Melocik et al. | 324/433 |
| 4,493,001 | 1/1985 | Sheldrake | 361/92 |
| 4,509,005 | 4/1985 | Stroud | 320/68 |
| 4,516,066 | 5/1985 | Nowakowski | 320/15 |
| 4,733,100 | 3/1988 | Nusairat et al. | 307/10 R |
| 4,782,240 | 11/1988 | Davidson | 307/10 BP |
| 4,832,146 | 5/1989 | Luby | 307/10.2 |
| 4,902,956 | 2/1990 | Sloan | 320/13 |
| 4,990,873 | 2/1991 | Grunert et al. | 335/68 |
| 5,089,762 | 2/1992 | Sloan | 320/13 |

Primary Examiner—Todd E. DeBoer
Attorney, Agent, or Firm—Willian Brinks Olds Hofer Gilson & Lione

[57] ABSTRACT

A vehicle storage battery protection system that senses a drop in battery voltage to a level at which the battery still retains sufficient power to start the vehicle. If the sensed voltage remains at or below this level for a time greater than the time normally required to start the vehicle, the battery is disconnected from the load and a hysteresis signal is provided to prevent a reconnection as the battery voltage begins to rise after the load has been disconnected. The load is automatically reconnected to the battery upon operation of the ignition switch to restart the vehicle. A reset circuit provides a small test voltage to the disconnected load, and senses a voltage drop caused by operation of the ignition switch to start the vehicle. This sensed voltage drop is detected and causes a main switch to reconnect the battery to the loads.

39 Claims, 5 Drawing Sheets

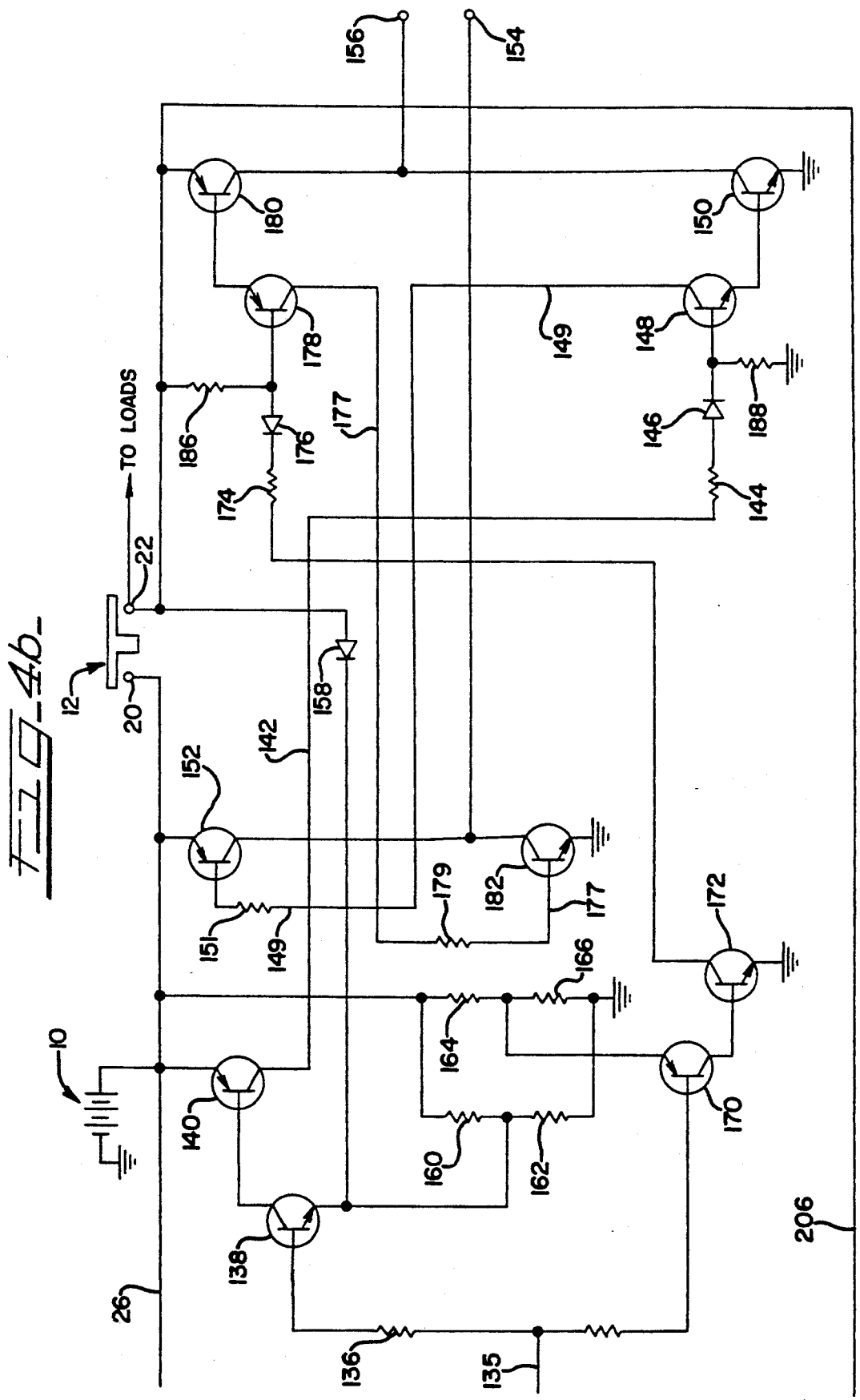

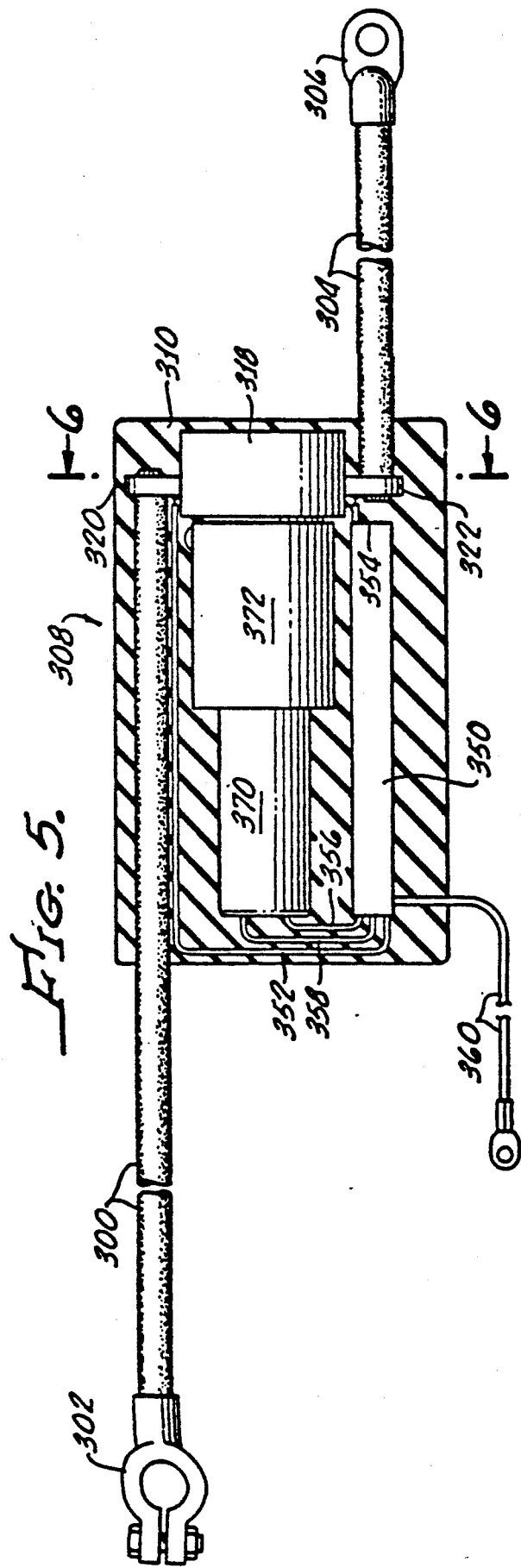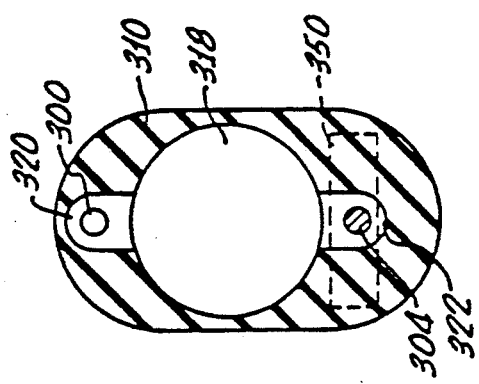

FIG._7A_
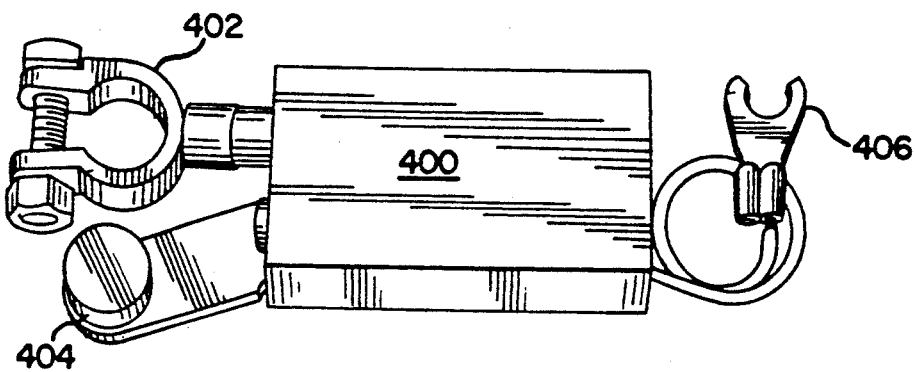
FIG._7B_
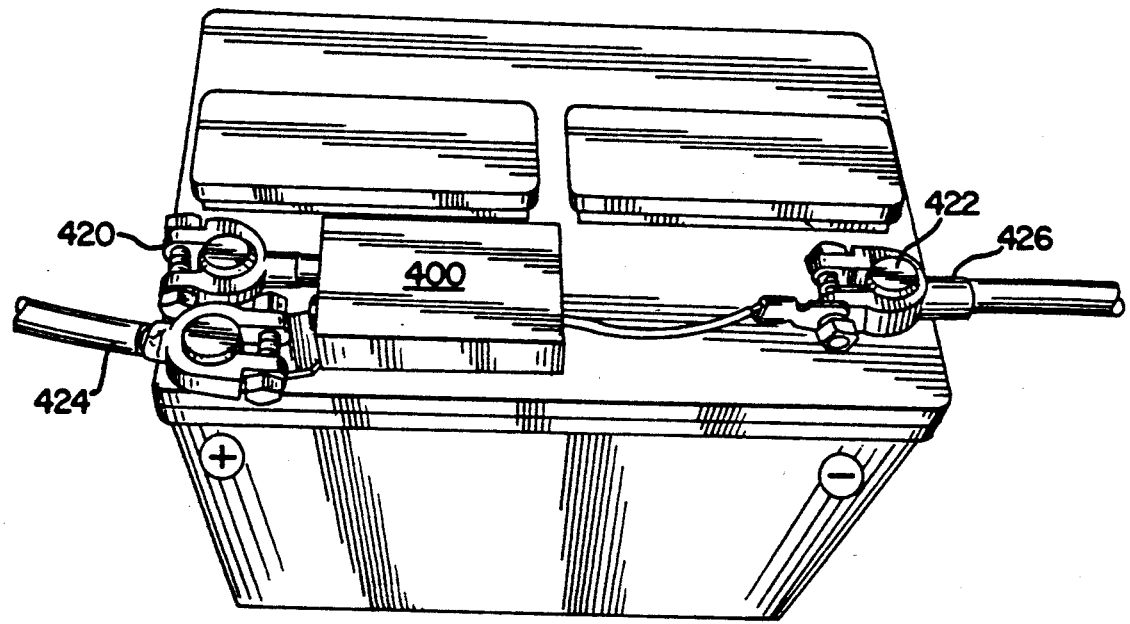

BATTERY PROTECTION SYSTEM

This is a continuation-in-part of application Ser. No. 07/504,238, filed Apr. 4, 1990, now abandoned.

FIELD OF THE INVENTION

The present invention relates to a protection system for vehicle storage batteries, and more particularly, concerns a system in which electrical loads are disconnected if the battery voltage falls below a predetermined level, and in which the vehicle can still be started without any operator action other than normal operation of the ignition switch.

BACKGROUND OF THE INVENTION

Battery protection systems typically sense battery condition when the battery is not being charged, as for example, when the engine of the vehicle is off. Should a load remain on after the vehicle is turned off, the load will be disconnected before the battery is completely discharged. However, when a partially discharged battery is disconnected from its load, the voltage appearing across the battery increases. Thus, measured voltage increases to an open circuit voltage, which could cause the load to be reapplied, resulting in a cyclic disconnect and reconnect operation. Further, during normal vehicle starting operations, sensed battery voltage will drop substantially due to the large current drain of the starting solenoid, but the system must not disconnect the loads.

In some prior systems, such as U.S. Pat. No. 4,902,986, the system must be manually reset by the operator in order to start the vehicle engine after the loads have been disconnected. Some of these systems such as U.S. Pat. No. 4,493,001 also require special connections to other elements of the vehicle in order to reconnect the load. All of these special requirements and equipment are costly and inconvenient to the vehicle operator, who preferably should be able to start the vehicle by doing nothing more than inserting and turning the ignition.

SUMMARY OF THE INVENTION

Accordingly, it is an object of the present invention to provide a battery protection system which automatically reconnects the battery to the load upon operation of the vehicle ignition system.

In accordance with a preferred embodiment of the invention, a battery protection system is provided in which a low battery signal is generated when voltage at the battery falls below a selected level. A normally closed switch is then opened to disconnect the battery from the load. The selected level is set at a voltage sufficient to restart the vehicle by normal operation of the ignition switch.

Opening the switch in response to the low battery signal is delayed to ensure that the battery voltage has remained below the selected level for a sufficient time to ensure that a true low voltage condition exists and not simply the result of normal starting operations. Hysteresis means are also provided to effectively lower the sensed battery voltage so that the resultant rise in battery voltage due to disconnection of the load will not cause the load to be reconnected. In one preferred embodiment, low voltage disconnect operation may be inhibited while the engine is running.

To restart the vehicle after the battery has been disconnected, a reset pulse is provided in response to a change in voltage across the load to temporarily disable the voltage sensing means and reconnect the battery to the load. The reset pulse is generated in response to a change in voltage across the disconnected load, but its operation is delayed for a short time to avoid a spurious reset during proper disconnection of the load and resultant rise in battery voltage.

According to another feature of the invention, the entire battery protection system is integrated into one of the battery cables so that the protection system can be installed merely by connecting the battery cable in substantially the usual manner of a conventional cable. In another preferred embodiment, the battery protection system is situated in a housing that connects between the end of one battery cable and a battery terminal, and has dimensions so as to be located on top of the battery between the terminals.

The features and advantages of the invention will be further understood upon consideration of the following detailed description of the presently preferred embodiments of the invention, taken in conjunction with the appended drawings.

BRIEF DESCRIPTION OF THE DRAWINGS

FIGS. 4A and 4B together form a preferred embodiment of a circuit diagram of the system of FIG. 1;

FIG. 5 is a longitudinal view, partly in section, of a battery cable having a built-in battery protection system according to the invention;

FIG. 6 is a section taken along lines 6—6 of FIG. 5 showing the disconnect switch of one preferred embodiment of the invention; and FIGS. 7A and 7B are two views of another presently preferred housing for the battery protection system of the invention.

DETAILED DESCRIPTION OF THE PRESENTLY PREFERRED EMBODIMENTS

The battery protection system of the present invention provides protection for a vehicle storage battery against discharge below a predetermined voltage threshold while the engine is not running. The system protects against discharge below a threshold greater than total discharge due to a current drawing condition resulting from any load connected to the battery. The system operates automatically without any additional action by the vehicle operator, or any noticeable effect, other than normal starting operations.

The system monitors battery voltage while the vehicle is not in operation and there are ostensibly no loads, or only minimal loads, drawing current from the battery. However, should a load inadvertently remain across the battery, the system will automatically disconnect all electrical loads from the battery after the battery voltage has fallen to a predetermined level where sufficient power remains to restart the vehicle. An example of one such condition would occur if the vehicle headlights were to remain on after the vehicle is parked.

A preferred voltage level may be on the order of about seventy percent of the full battery charge. For example, in a lead-acid battery that has a 12.68 volt fully charged output without load, an exemplary system embodying principles of the present invention will disconnect the load when the battery voltage falls to about 12.44 volts. Thus, all loads are disconnected well before the battery has discharged below the point where it will no longer supply the desired rated cold cranking current to restart the vehicle. Typically, a fully discharged lead-acid battery possesses a voltage of about 11.89 volts.

Means are also provided which permit the battery to drop a predetermined voltage caused by normal vehicle starting operations, without disconnecting the load.

Importantly, the existence and operation of the system is transparent to the user. If a drain on the battery should occur such that the system disconnects the load, enough voltage will remain in the battery to restart the vehicle upon normal operation of the ignition switch. Operation of the ignition switch is sensed by the system to automatically reconnect the battery to the load, and thus provide the remaining power of the protected, partly discharged battery to the vehicle starting system.

Figure 1:
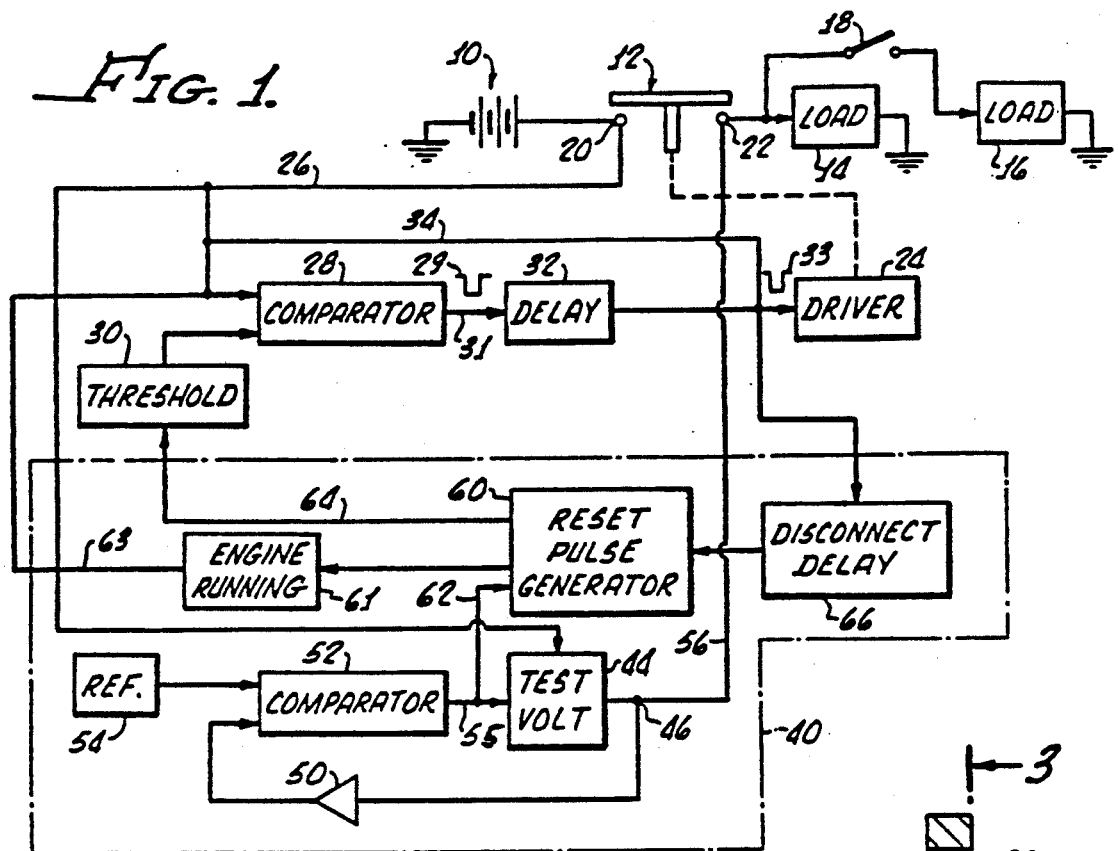
FIG. 1 is a block diagram of a preferred embodiment of a battery protection system employing the principles of the present invention.

As illustrated in FIG. 1, a vehicle battery 10 is connected through a normally closed main switch 12 to an unswitched load 14, and to a switched load 16, which is under control of an ignition switch 18. Load 14 may include, for example, headlights, radio, and the like. Load 16 may be, for example, the starter motor and starter solenoid. The standard vehicle electrical system connects the battery to loads 14 and 16 directly without interposition of the main switch 12. To apply the system of the present invention in a conventional vehicle electrical system, it is only necessary to connect the main switch 12 between one battery terminal, such as the positive terminal, and the loads, as shown in FIG. 1.

The switch 12 connects or disconnects terminals 20 and 22 according to the switch condition as determined by a switch driver 24. With the switch 12 in a closed position, the terminals 20, 22 are connected to one another, and the battery is thus connected to the load. When the switch is driven to the open position, the terminals 20, 22 are disconnected and the loads are disconnected from the battery.

Battery voltage at the positive switch terminal 20 is sensed through line 26 and is connected as a first input to a comparator 28. A second input to the comparator 28 is provided from a reference or threshold voltage generator 30. The comparator 28 provides a low output 29 on line 31 when the sensed battery voltage at terminal 20 falls below the threshold determined by the threshold voltage generator 30.

The comparator output 29 is connected through a delay circuit 32, which provides a fault signal 33 to the switch driver 24, to open the main switch 12 after the sensed voltage has remained below the threshold for the delay period. Generation of the fault signal 33 will occur if the voltage drops below the threshold for the duration of the delay period regardless of the size of the load causing the condition. The comparator output 29 is thus a function of time alone, and is independent of the size of the voltage drop below the threshold.

Delay Circuit 32

In normal operation when the vehicle is started by engaging the ignition switch 18, the sensed voltage on line 26 will drop as the starter solenoid and starter motor (not shown) draw current from the battery 10. This sensed voltage drop would normally cause the main switch 12 to open. However, the delay circuit 32, which initiates its delay interval when the low battery output 29 occurs, is interposed between the comparator 28 and the switch 12 to inhibit delivery of the fault pulse 33 for the delay period. If the fault signal 33 was not delayed, operation of the starter would result in a drop in voltage at the battery, and the low battery voltage signal 29 would be provided at the output of comparison circuit 28.

A delay period of fifty-five to sixty seconds should be long enough to cover the time normally required to start the vehicle by operation of the ignition switch 18. Thus, a sensed voltage drop due to normal starting operation will not inadvertently open the main switch 12. The output of the comparator 28 appearing on line 31 will rise to disable the delay circuit 32 prior to the end of the delay period. Accordingly, the delay circuit will not time out, and the disconnect signal will not be transmitted to the switch driver 24. On completion of the starting operation, the starter motor is disconnected so the battery voltage will return to its normally higher level.

Should the low voltage sensed on line 26 result from a drain on the battery so that the battery voltage remains in a lowered condition for longer than the delay period, the delay circuit 32 will time out and provide the fault signal 33 to the switch driver 24. This operation causes the main switch 12 to open and disconnect the loads from the battery. When the loads are disconnected, there is no further drain on the battery.

Upon disconnection, voltage across the terminals 20, 22 will begin to increase, and within several minutes will attain the open circuit voltage of the battery. The open circuit voltage, however, may be above the threshold voltage of circuit 30. Thus, this increase in voltage may cause the output 29 of the comparator 28 to rise and result in reapplication of the loads. In order to prevent such cyclical operation, a hysteresis feedback signal is provided on line 34 to the voltage sensing input of the comparator 28 to maintain the input at a value below the threshold. This feedback prevents closing the main switch 12 and thus avoids repetitive off and on cycling.

Reset Circuit 40

System reset circuitry 40 is preferably provided to continuously test the disconnected load and sense a change in load caused by an attempted restart of the vehicle. A test voltage generator 44 is connected across the main switch 12 and is supplied with power from the positive terminal 20. The test voltage generator 44 employs a closed loop, negative feedback arrangement to establish a small test voltage at its output on line 46. A preferred value for such test voltage is about 3 millivolts.

The closed loop arrangement maintains a relatively stable voltage on line 46 over a wide range of loads. The voltage on line 46 is connected through an amplifier 50 to a comparison circuit 52. The comparison circuit 52 compares the amplified voltage on line 46 to a reference voltage established by a reference circuit 54. The difference between the feedback voltage on line 46 and the reference voltage appears as an output on line 55 from the comparison circuit 52. The output on line 55 serves as an input to the test voltage generator 44 to vary the value of the voltage generated by minimizing changes in the voltage on line 46. This negative feedback stabilizes the test voltage at a small value over a wide range of loads.

The test voltage on line 46 is applied to both loads 14, 16 through line 56 and through terminal 22 of the main switch 12. This small voltage is applied to the loads 14, 16 while they are disconnected from the battery 10 and after the main switch 12 has been opened due to an inadvertent battery drain.

Operation of the ignition to start the vehicle will close ignition switch 18 and will connect the starter solenoid (load circuit 16) momentarily in parallel with the small cold resistance of load 14. Closing ignition switch 18, therefore, causes a very small change in resistance across load 14, which changes the voltage seen on line 46. This change in voltage causes an output to appear on line 55 from comparison circuit 52. This output is coupled through line 62 to a reset pulse generator 60. The reset pulse generator 60 provides a reset signal to the threshold circuit 30. The reset signal operates to lower the threshold voltage at the second input of comparator 28, and as a result resets the delay circuit 32, thus removing the fault pulse. Removal of the fault pulse causes driver 24 to close the disconnected main switch 12.

Operation of the ignition switch 18 is sensed by the reset circuit 40, which engages the switch driver 24 to substantially immediately close main switch 12. Closing switch 12 is preferably accomplished in less than one second. The operation is such that the vehicle driver is not aware of any delay or difference in operation, and is able to start the vehicle in a normal manner.

Disconnect Delay Circuit 66

When a low battery voltage has been detected and has remained in excess of the delay period, switch 12 is opened and the voltage at terminal 22 begins to decay rapidly. The reset circuit 40 would normally sense this drop in voltage and generate a reset pulse to immediately close switch 12. If this were allowed to happen, the system would repetitively cycle on and off. To avoid such recycling, the reset pulse generator 60 must be inhibited for a selected period of time (on the order of several seconds) by means of a disconnect delay circuit 66 triggered by the occurrence of the fault signal 33. Thus, the reset circuit is effectively isolated from the threshold circuit for a short period of time after the main switch 12 is opened.

After the main switch 12 has remained open for several seconds, the voltage at terminal 22 becomes relatively stable, and the reset pulse generator 15 is again allowed to operate until the ignition switch is reengaged. Thereafter, a valid reset pulse quickly closes switch 12 and allows current from the battery to be supplied to the starter solenoid.

Engine Running Circuit 61

The protection circuitry discussed so far will operate whenever the battery voltage falls below the predetermined threshold, whether this occurs while the vehicle is parked or while the engine is running. However, for most applications it is not desirable to disconnect the loads from the battery while the engine is running. If the battery voltage should drop below the threshold while the engine is running, the main switch 12 will open. If the alternator is not operating to provide electrical power during such occurrence, the vehicle engine would simply stop. Accordingly, an engine running signal is preferably provided by means of an engine running circuit 61, which raises the sensed battery signal and prevents generation of the fault signal.

The engine running circuit 61 operates by sensing a ripple or slight variation in current through the load due to either alternator or ignition operation, and raises the sensed battery signal at the input to comparator 28. The ripple from the alternator or ignition is amplified through a high gain amplifier consisting of a series of operational amplifiers. The high gain amplifier magnifies this ripple into approximately a 12 volt square wave. The square wave is then connected to a pulse pump circuit that serves to maintain a voltage above the threshold level at the input to the comparator 28.

Motor Driven Switch

Figure 2:
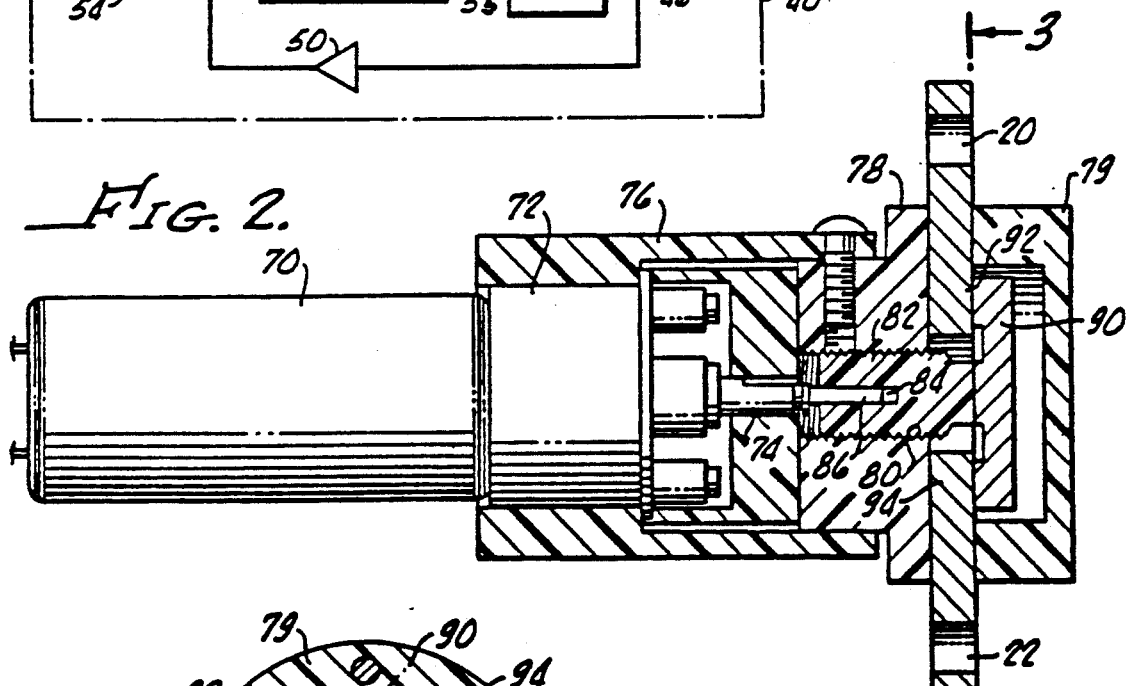
FIG. 2 is a longitudinal, sectional view of a motor driven switch that may be employed in the system of FIG. 1.
Figure 3:
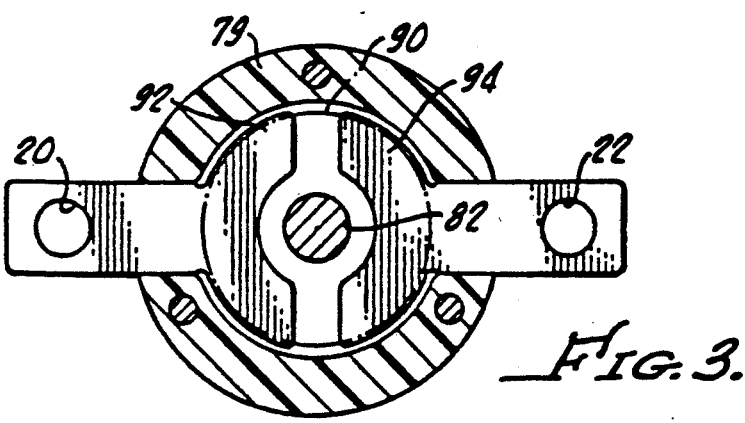
FIG. 3 is a section taken along lines 3—3 of FIG. 2.

A presently preferred embodiment of the invention employs a motor and gear driven switch of the type illustrated in FIGS. 2 and 3. The motor driver 24 (shown in FIG. 1) includes circuitry that operates a small bi-directional DC motor 70. Due to its small size, the bi-directional DC motor 70 can be easily located anywhere on the vehicle body. Moreover, the motor 70 can be preferably operated with small currents on the order of 250 milliamperes. A further advantage of the bi-directional DC motor 70 is its lack of susceptibility to inadvertent operation. Unlike the uni-directional relays of the prior art, since the bi-directional motor 70 requires a positive voltage to drive it in either direction, inadvertent operation due to noise is unlikely.

The motor 70 has a gear box 72, which drives an output shaft 74. A housing 76 is provided around the motor 70 that includes a cap 78 having an internally threaded bore 80, which rotatably and threadedly receives an externally threaded stub shaft 82. The threaded stub shaft 82 has a noncircular axial bore 84, which receives a mated noncircular end 86 of the motor driven shaft 74. Thus, rotation of the motor 70 and shafts 74 and 86 will rotate the stub shaft 82 and drive it axially of the motor in either direction.

The outermost end of the stub shaft 82 has a fixed rotary contact ring 90 arranged to alternatively contact or be displaced from a pair of switch contacts 92, 94 mounted to the switch cap 78 between the cap and the cap cover 79. The contacts 92, 94 are electrically insulated from one another and are of generally semicircular configuration (FIG. 3). The contacts cooperate with the bi-directional, axially driven contact ring 90 to electrically connect or disconnect the switch terminals 20 and 22 to or from the loads 14, 16.

In a preferred embodiment, the 12 volt bi-directional DC motor 70 (part no. LA16g-32-4, manufactured by Copal) is about 16 millimeters in diameter, and is about 59 millimeters in length. The gear box, in an exemplary embodiment, has a ratio of 1:120 and a nominal speed of 60 rpm, providing high torque and sufficient speed of operation to pull the rotary contact ring 90 into proper electrical contact with contacts 92, and 94, and to hold such contact. The cap 78 and the shaft 82 are preferably composed of nonconductive material such as nylon. The contacts 92, 94 and the contact ring 90 are preferably made of brass and may be cadmium plated if necessary or desirable.

An additional advantage of the high speed miniature motor 70 is its polar moment of inertia, which will result in as much as a one-half additional revolution after its drive power has been removed. This additional one-half revolution creates an over-travel in both directions of motion to ensure positive contact or positive contact clearance and also provides a wiping motion which ensures a clean electrical connection between the contacts 92, 94 and the contact ring 90 upon each closing of the switch 12. The motor drive circuitry is arranged to disconnect the electrical drive for the motor immediately upon opening or closing of the contacts. Only one quarter turn of the contact ring 90 is therefore required to open or close the switch, and the switching action is completed with just a few revolutions of the motor.

Detailed Circuit Diagram

Figure 4A:
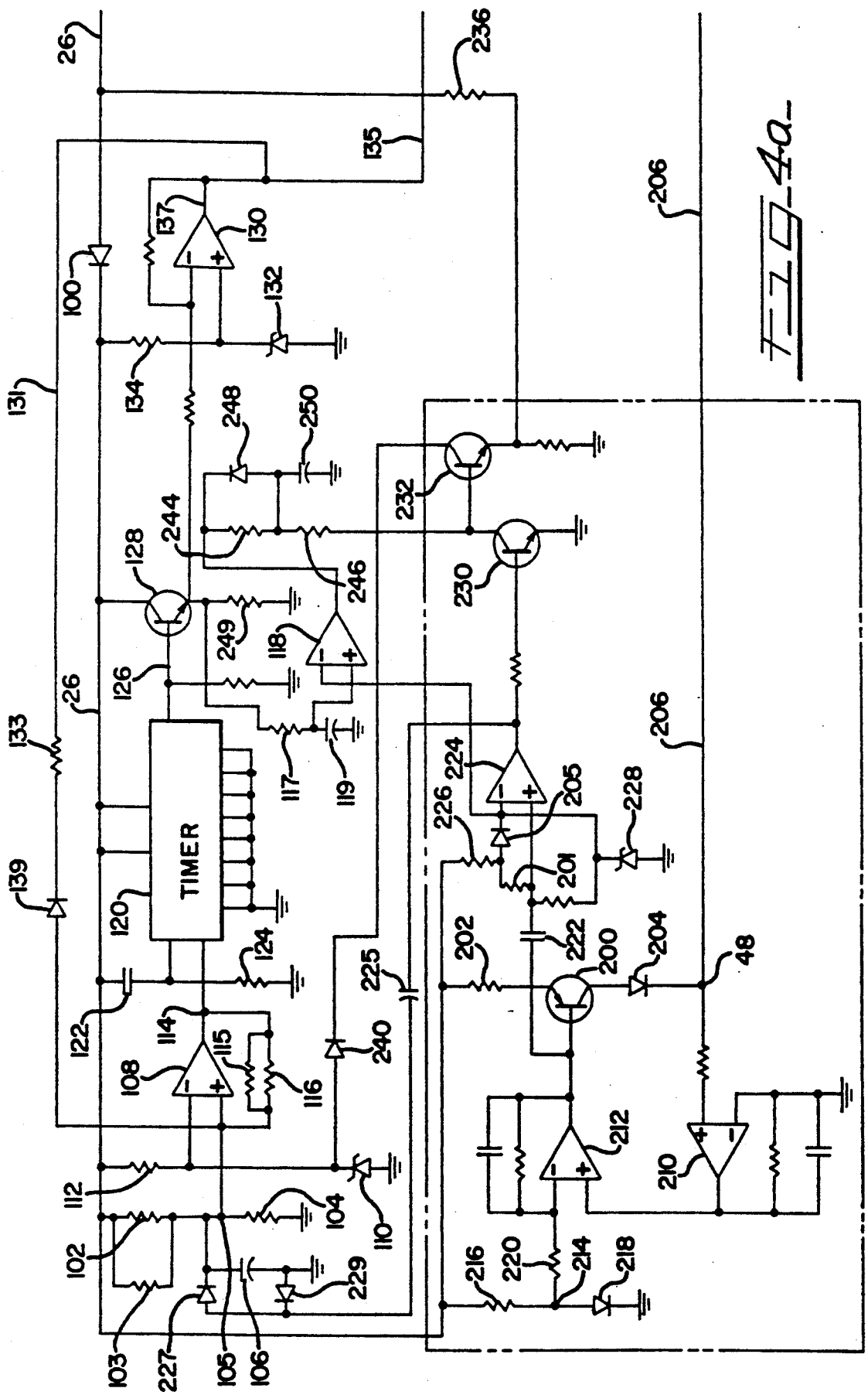

Referring to the detailed circuit diagram shown in FIGS. 4a and 4b (with FIG. 4b placed to the right of FIG. 4a to form a complete diagram), the battery voltage appearing at the positive terminal 20 (FIG. 4b) is sensed on line 26 and is connected through a diode 100 (FIG. 4a) to the upper end of a voltage divider formed of resistors 102 and 104. The junction between resistors 102 and 104 is the battery voltage sensing node 105, and is connected to ground through capacitor 106. The voltage sensing node 105 is also connected to the noninverting input of operational amplifier 108 (corresponding to the comparator 28 of FIG. 1).

Attached to the inverting input of operational amplifier 108 is a threshold or reference voltage provided at the cathode of a zener reference diode 110 connected between ground and the positive battery terminal through a resistor 112 and diode 100. The threshold voltage provided by the zener diode 110 is established at a value, preferably 6.2 volts, such that amplifier 108 will provide a normally high output on line 114 when the battery voltage is above seventy percent of its full charge.

The threshold voltage provided by the zener diode 110 is preferably chosen at 6.2 volts since it is the most stable voltage for most zener diodes across a wide variation of temperature. A voltage divider, composed of resistors 102, 103 and 112, are configured such that when the voltage at the battery terminals drops to its predetermined level (approximately 70% of the fully charged voltage) the voltage provided at the inverting input to amplifier 108 equals 6.2 volts. The voltage divider network, therefore, scales down the threshold voltage to the optimal range of operation for the zener diode 110. The parallel combination of resistors 102 and 103 allows precise calibration of the voltage divider network to achieve the 6.2 volt threshold.

A small amount of positive feedback is provided to the noninverting input of amplifier 108 through the parallel combination of resistor 115 and resistor 116 to minimize any noise on the output of amplifier 108. This output is provided as the triggering input to a programmable and resettable counter/timer 120 (corresponding to delay circuit 32 in FIG. 1). A second input to the counter/timer 120 is provided from the junction of a capacitor 122 and resistor 124 connected between the positive battery voltage and ground. This input establishes the counting frequency for the timer 120. The timer 120 is reset to zero upon receiving a high output from amplifier 108, and is triggered to count by a low output from amplifier 108.

In its counting state the timer counts on from zero to a predetermined count, representative of the desired delay, before disconnecting the main switch 12. When the predetermined count is reached, the normally low output of the counter on line 126 rises to drive an NPN emitter-follower transistor 128, which provides a high signal to the inverting input of a motor drive control. The motor drive control comprises an operational amplifier 130 having its inverting input connected to the emitter of transistor 128.

The counter/timer 120 continues to count as long as the output 114 from amplifier 108 remains low. Should the output 114 return to its normally high condition after the counter has commenced counting, but before it has reached its full preprogrammed count, the timer 120 is reset to zero. A high signal at timer output 126 will not occur unless the output from amplifier 108 remains low for the full duration of the count programmed into timer 120. As previously mentioned, this time period is preferably about fifty-five to sixty seconds, and will prevent the battery protection circuit from disconnecting the battery when the battery voltage experiences a momentary drop.

A reference voltage is applied to the noninverting input of amplifier 130 from the cathode of a zener diode 132 connected between ground and the positive battery voltage through a resistor 134 and diode 100. A high signal connected to the inverting input of amplifier 130, when compared to the reference voltage, will provide a low signal at the output 137 of amplifier 130. This low output 137 comprises the fault signal discussed above, which operates the drive circuit of motor 70 to open the main switch 12.

A feedback loop is provided from the output of amplifier 130, over line 131, through resistor 133 and diode 139, to the noninverting input of amplifier 108. The fault signal is thereby fed back to the noninverting input of amplifier 108 to maintain this input sufficiently low to ensure retention of the fault output. This feedback loop is required, as explained above, since the battery voltage will tend to rise when the main switch 12 opens, which might reset the system.

While the main switch 12 is closed, a high voltage appears at the output of amplifier 130, which is connected through line 135 and resistor 136 to NPN transistor 138. Transistor 138 drives PNP transistor 140, which has its emitter coupled to the battery and its collector connected through line 142, resistor 144 and diode 146 to the base of PNP transistor 148. Transistor 148 has its emitter connected to the base of a PNP power transistor 150. The collector of transistor 148 is connected through line 149 and resistor 151 to the base of a second PNP power transistor 152, which has its emitter connected to the positive battery terminal 20.

A high signal at the output of amplifier 130 turns on transistor 138, which activates transistors 140, 148, 150 and 152. When transistors 140, 148, 150 and 152 conduct, current flows from the battery terminal 20 through transistor 152 to a first motor terminal 154. The path continues through the motor, through a second motor terminal 156, and then through power transistor 150 to ground. This flow of current causes the motor 70 to operate in the direction to close the main switch 12. With the main switch 12 closed, terminal 22 receives the battery voltage transmitted through diode 158 to the emitter of transistor 138, cutting off transistor 138, as well as transistors 152 and 150 of the motor drive circuit.

While the main switch 12 is closed, the protection system is in a steady state condition. In this condition, the vehicle electrical system will operate as if the protection system were absent. Battery loads, lights, ignition and the like can be applied with no effect on the protection system since the alternator will provide power to these loads. However, if the vehicle engine is off, and an electrical load is connected between the battery terminals such as when the headlights are left on, or there is a short circuit or another fault occurs that causes a drain on the battery, the battery output voltage will begin to decay.

With continued decay, the voltage at the sensing node 105 will eventually fall below the threshold established by zener diode 110 and will cause the output of amplifier 108 to drop and trigger operation of the timer 120. If the low battery condition remains for a time period longer than the predetermine count, the output of the timer 120 will rise and drive the output of amplifier 130 low. This low output is connected to the base of PNP transistor 170, which begins to conduct, thus turning on NPN transistor 172.

The collector of transistor 172 is connected through resistor 174 and diode 176 to the base of PNP transistor 178, which has its emitter connected to the base of a PNP power transistor 180. The collector of transistor 180 is connected to motor terminal 156. The collector of transistor 178 is connected through line 177 and resistor 179 to the base of an NPN power transistor 182. The collector of power transistor 182 is connected to motor terminal 154.

Accordingly, a low signal at the output of amplifier 130 will turn on transistors 170, 172, 178, 180 and 182. Turning on these transistors causes current to flow from the positive side of the battery through terminal 22 and power transistor 180, through the motor from terminal 156 to 154 (which is opposite the direction of current flow when the main switch 12 is open), and then through transistor 182 to ground. This flow of current reverses the direction of motor operation to drive the switch contact ring 90 away from the contacts 92, 94 and disconnect the loads from the battery.

While the main switch 12 is open, battery voltage no longer appears at terminal 22, and there is no drive current through transistor 180 to the remainder of the circuit. Further energization of the motor is stopped as soon as the main switch 12 is opened. Resistor 186, connected between the base of transistor 178 and terminal 22, and resistor 188 connected between ground and the base of transistor 148, provide bypass paths to ensure that the power transistors are cut off in their nonoperative states. This precludes the possibility of simultaneously engaging opposite sets of transistors to drive the motor 70 in opposite directions.

Preferably, transistors 138 and 170 are back biased by a circuit including resistors 160, 162, 164 and 166 connected to provide a positive potential from the battery to the emitters of these transistors. This back bias circuit prevents any ambiguous states for amplifier 130, which might otherwise engage both transistor 138 and transistor 170 at the same time.

While the main switch 12 is open, after a fault has been sensed, the reset circuit provides a relatively small but stable test current to the loads (now disconnected from the battery). The test current will remain at its stabilized value over a wide range of load resistances. The reset test current is generated by PNP transistor 200 (corresponding to test voltage generator 44 of FIG. 1), which has its emitter connected through resistor 202, line 26 and diode 100 to the positive terminal of the battery. This transistor is not disabled by opening of the main switch 12. The collector of transistor 200 is connected through diode 204 and test line 206 to terminal 22 of the main switch 12. Effectively, this test current generating transistor 200 is connected in parallel with the main switch 12 to connect the battery directly to the load through transistor 200, diode 204, resistor 202 and diode 100.

Current traveling through transistor 200 is stabilized at a very small value so that a stable voltage of three millivolts is maintained at the cathode of diode 204 at test point 48. The voltage at test point 46 is controlled and stabilized by a closed loop control circuit including a first operational amplifier 210, having its noninverting input connected to test point 48 and its output connected to the noninverting input of a second operational amplifier 212. Amplifier 212 has its output connected to the base of transistor 200. A test reference potential is established at point 214 between resistor 216, connected to the positive terminal of the battery, and diode 218 connected to ground. The test reference potential is connected through resistor 220 to the inverting input of amplifier 212. This arrangement provides a closed loop stabilization of the test current and voltage at test point 48 in order to accommodate a wide dynamic range of load resistances.

The circuit will maintain a constant voltage at test point 48 whether the load inadvertently left on (and causing the sensed fault) comprises small lights, such as glove compartment or trunk lights, or headlights. However, when a second predetermined load, such as the starter solenoid, is momentarily connected across the small cold resistance of this load, a minor change in the load resistance occurs that causes a small but sharp decrease in the test signal at point 48. In the preferred embodiment described above, the second predetermined load comprises the starter solenoid. It will, however, be recognized by those skilled in the art that the second load may comprise other suitable loads connected in a similar manner.

This change is amplified by amplifiers 210 and 212 to provide a negative pulse at the output of amplifier 212. This negative pulse is connected through capacitor 222 to the noninverting input of operational amplifier 224. Operational amplifier 224 has a reference voltage, established at its inverting input, between the cathode of diode 205 and zener diode 228. Resistor 226, diode 205 and zener diode 228 are positioned between the positive battery terminal and ground. The negative pulse from amplifier 212 also provides a negative pulse at the output of amplifier 224 connected to the base of NPN transistor 230, which cuts off this normally conducting transistor 230.

Cutting off transistor 230 provides base drive for NPN transistor 232, which is driven into conduction. Transistor 232 is normally cut off by connection of its emitter to the positive battery terminal through resistor 236. Turning on transistor 232 places a low voltage across diode 240 and at the threshold voltage reference point between the anode of zener diode 110 and the noninverting sensing amplifier 108. Thus, during an attempted restart of the vehicle the threshold voltage to amplifier 108 is lowered and the system is reset.

During the attempted restart, the reset system lowers the threshold value to a point below the voltage of the battery at the time it was disconnected from the load. As a result, the output of the sensing amplifier 108 rises, providing a low output at the timer and a high signal at the output of amplifier 130. This high from amplifier 130, as previously described, will energize the motor in the switch closing direction and effect closing of the main switch 12. With the main switch 12 closed, the battery power is again available to start the vehicle engine.

A disconnect delay circuit (element 66 of FIG. 1) is provided to prevent the reset circuit from reconnecting the battery after the load is first disconnected and a rapid decay of voltage at terminal 22 occurs. The disconnect delay circuit comprises an operational amplifier 118 connected to a pair of resistors 244, 246. The non-inverting input to amplifier 118 is connected between resistor 117, which is connected to the emitter of transistor 128, and capacitor 119, which is connected to ground. The inverting input to operational amplifier 118 is connected to the cathode of diode 225. The resistors 244, 246 are connected between the output of amplifier 118, and the base of transistor 232 and the collector of transistor 230. A diode 248 is connected across resistor 244 and its anode is connected to ground through a relatively large capacitor 250.

Capacitor 250 in normal condition (the main switch 12 is closed) is discharged, being connected to the normally low output of amplifier 118. Base drive for transistor 232 is derived from the charge on this capacitor through resistor 246. Thus, transistor 232 is normally off.

When the main switch 12 opens, the emitter of transistor 128 is pulled high, which causes the output of amplifier 118 to rise. As this output rises, capacitor 250 begins to slowly charge through resistor 244. However, the charge on the capacitor will remain at a relatively low value for several seconds because of the large time constant of capacitor 250 and resistor 244. Therefore, transistor 232 will not conduct for several seconds after the main switch 12 opens. The system reset circuit is thus inhibited for a time, preferably on the order of several seconds, immediately after the opening of the main switch 12. After the main switch 12 has remained open for a sufficient time to allow capacitor 250 to become fully charged, transistor 232 is turned on by the negative reset pulse provided from amplifier 224, which shuts off transistor 230.

While the engine is running, electrical noise from operation of the alternator or the ignition appears at test point 48. This noise is amplified into a series of square waves of approximately 12 volt amplitude at the output of amplifier 224. The noise signal, which appears on line 206 at point 48, is connected to a pair of operational amplifiers 210, 212 that function as a high gain amplifier. In a preferred embodiment, the gain of this high gain amplifier is about 44,000. The output from the high gain amplifier is connected to the non-inverting input of amplifier 224 through capacitor 222.

The engine running circuit, which is driven by the output of amplifier 224, includes a capacitor 225 and a pair of oppositely poled diodes 227, 299. Diodes 227 and 229 are connected to opposite sides of capacitor 106, which itself is connected between ground and the non-inverting input of comparator amplifier 108. The engine running circuit is, therefore, a pulse pump, which ensures that capacitor 106 remains charged above a certain voltage level.

On the rising edge of each of the square waves provided at the output of amplifier 224, a small voltage increment is added to capacitor 225. This incremental voltage is inversely proportional to the ratio of capacitor 225 to capacitor 106. For example, with a ratio of 0.01:2, each square wave adds 1/200ths of the square wave amplitude to capacitor 106. On each falling edge of the square wave, capacitor 225 discharges through diode 229. Capacitor 106, however, continuously discharges through resistor 104. Thus, under engine running conditions, this circuit operates to maintain a relatively high potential at the non-inverting input of comparator amplifier 108, which prevents a drop in sensed battery voltage as long as the engine is operating. Because the drop in sensed battery voltage is masked by the engine running signal, opening of the main switch 12 is prevented.

Table 1 below includes a list of suitable components for some of the elements described above.

(TABLE 1)

| ELEMENT | PREFERRED EMBODIMENT |
|---|---|
| Counter/Timer 120 | LS7210 Programmable Digital Delay Timer, Manufactured by LSI Computer Systems, Inc. |
| Amplifier 108, 130, 118, 210, 212 and 224 | LM358 Operational Amplifier |
| Transistor 128, 230, 232, 138, 172 and 148 | 2N3904 NPN Transistor |
| Transistor 200, 140, 170 and 178 | 2N3906 PNP Transistor |
| Transistor 152 and 180 | 2N5401 PNP Transistor |
| Transistor 150 and 182 | 2N5551 NPN Transistor |

BATTERY CABLE HOUSING

The battery protection system may be retrofitted to any existing vehicle merely by inserting the system between the loads and the positive terminal of the battery. It is also contemplated that this system may be incorporated as part of the battery, or provided in a separate housing mounted directly upon the battery or immediately adjacent the battery. The system may also be physically and electrically incorporated into the battery itself so that the system can be sold or installed in a vehicle together with, and as a part of, the battery.

Although there are many different ways in which the battery protection system may actually be incorporated into the vehicle electrical system, in one preferred embodiment the system is incorporated into the battery cable. Installing this system merely requires replacing an existing battery cable with the new battery cable. Such a battery cable is shown in FIGS. 5 and 6.

A modified battery cable including a first cable section 300, having a connector 302, is adapted to be connected to a battery terminal. A second battery cable section 304, having a connector 306, is adapted to be connected to vehicle loads. Interposed between the two sections is the battery circuit protection system 308, which includes a housing molded or otherwise manufactured of suitable strong, protective and nonelectrically conductive plastic 310. The motor and switch assembly illustrated in FIG. 2 are mounted (and may be potted) within the housing 310, and are shown in FIG. 5 as a motor 370, a gear box 372 and the main switch 318.

The switch 318 has first and second sides or terminals 320 and 322, respectively, which are electrically connected or insulated from each other upon operation of the switch. One end of battery cable section 300 extends through (and is fixedly connected to) one side of housing 310 and connects to switch terminal 320. Similarly, one end of battery cable section 304 extends partly through (and is fixedly connected to) the other side of housing 310 and connects to switch terminal 322.

A circuit board 350 is securely mounted (and may be potted) within the housing 310 and connected through lines 352 and 354 to the switch terminals 320, 322, and through lines 356, 358 to the motor 370. The circuit 350 is also connected through line 360 to the exterior of the housing 310 for connection to vehicle ground.

Although the housing 310 may take many different forms, it preferably comprises a nearly solid plastic body, which effectively encapsulates all of the parts shown, and thus becomes a mere enlargement of an intermediate portion of the common battery cable.

In another preferred embodiment shown in FIGS. 7A and 7B the battery protection system can be situated directly on top of the battery between the terminals. In this embodiment, the battery terminals are of a standard size according to the Battery Council International and/or Society of Automotive Engineers. These terminals may be tapered terminal posts where the negative terminal has a small diameter of $\frac{5}{8}$" and the positive terminal has a small diameter of 11/16"; both terminals possess a 1$\frac{1}{8}$ taper per foot and a $\frac{5}{8}$" minimum length of taper. In a fashion similar to that described above in connection with FIGS. 5 and 6, the battery protection system of this invention is enclosed in a housing 400 molded or otherwise manufactured of suitable strong, protective and non-electrically conductive plastic.

Connected to the housing 400 is a battery terminal connector 402 which attaches to preferably the positive battery terminal 420. This connector 402 has the appropriate dimensions described above to connect to such terminal 420. Also connected to the housing 400 is a terminal 404. The terminal 404 is advantageously configured such that a normal battery cable 424 may be connected to it. As such, terminal 404 has the same dimensions described above for a positive battery terminal. Also provided is a connector 406 coupled to the housing 400, which attaches to the battery cable 426 preferably at the negative battery terminal 422. The connector 406 need not be a battery terminal connector such as battery terminal connector 402. Since the battery cable itself attaches to the negative terminal in the embodiment shown in FIG. 7B, the connector 406 can simply be a washer or "C" connector that fits within the battery terminal connector as shown.

In the manner illustrated in FIG. 7B, the battery protection system is easily retrofitted to existing batteries. Instead of attaching the positive battery cable 424 to the positive terminal of the battery 420, the cable is attached to terminal 404. In the normal fashion, the negative battery cable 426 is attached to the negative terminal 422. The battery protection system simply connects to the battery at positive terminal 420 through connector 402, and at the negative terminal 422 through connector 406. The dimensions of the housing 400 are such that the battery protection system does not extend above the normal height of the battery terminals 420, 422, nor beyond the top surface area of the battery.

There has been described a system that prevents discharge of a battery to a predetermined point beyond which it cannot be used to start the vehicle engine by sensing partial discharge of the battery and disconnecting all loads while the battery still has sufficient energy to restart the vehicle engine. The system ensures that the vehicle may be restarted simply by the normal operation of the ignition switch. Such operation causes the protective system to generate a reset pulse that immediately closes the main switch and provides battery power to the starter and other loads.

It is to be understood that a wide range of changes and modifications to the embodiments described above will be apparent to those skilled in the art, and are contemplated. It is, therefore, intended that the foregoing detailed description be regarded as illustrative rather than limiting, and that it be understood that it is the following claims, including all equivalents, that are intended to define the spirit and scope of this invention.

We claim:

1. For use in conjunction with an engine system having a battery, an ignition system, and a first at least one electrically powered load connected to the battery, a device adapted to electrically disconnect the battery from the first at least one load whenever the battery energy falls below a predetermined value and to automatically connect the battery to the first at least one load, said device comprising:

a normally closed main switch for connection between a battery and the first at least one electrically powered load;

means for sensing an electrical battery characteristic indicative of battery drain and for generating an output signal whenever the energy capacity of said battery falls below a predetermined value;

timing means responsive to said sensing means output signal for generating a timing output signal a delay interval after said sensing means output signal;

means responsive to said timing means output signal for opening said main switch;

circuit means including said first at least one electrically powered load for connection to a second at least one electrically powered load such that when said second load is connected to said first at least one electrically powered load the voltage across said circuit means decreases; and automatic reset means connected to said circuit means for closing said main switch when the voltage across said circuit means changes.

2. The device defined in claim 1, wherein said device is adapted to be located entirely within the battery of within a housing adapted to be supported by the battery.

3. The device defined in claim 1, wherein said predetermined value is approximately seventy percent of the voltage provided in a fully-charged battery.

4. The device defined in claim 1, wherein said battery comprises a lead-acid battery and said predetermined value is approximately 12.24 volts.

5. The device defined in claim 1, wherein said delay interval is a time greater than the time normally required to start said vehicle by operation of said ignition system.

6. The device defined in claim 1, wherein said second at least one load is connected in response to operation of said ignition system.

7. The device defined in claim 1, wherein said means for sensing comprises threshold means for establishing a threshold potential, means for sensing battery voltage, and means for comparing sensed battery voltage to said threshold potential, said reset means comprising means responsive to a decrease in voltage across said circuit means for relatively lowering said threshold potential with respect to sensed battery voltage.

8. The device defined in claim 1, further including hysteresis means responsive to said timing output signal for maintaining said timing output signal when said battery voltage rises above said selected level after said main switch is opened.

9. The device defined in claim 1, further including hysteresis means responsive to said timing output signal for causing said sensing means to generate said sensing means output signal when said battery voltage recovers to rise above said predetermined level, whereby the timing output signal remains when the battery voltage increases upon opening of said main switch.

10. The device defined in claim 1, wherein said means for sensing comprises means for generating a sensed battery voltage signal, and further comprising hysteresis means for lowering said sensed battery voltage signal in response to said sensing means output signal.

11. The device defined in claim 1, further including means for inhibiting said reset means to a predetermined time after generation of said sensing means output signal.

12. The device defined in claim 1, wherein said automatic reset means comprises means for applying a relatively stabilized voltage to said first at least one electrically powered load, and means for sensing a change in said stabilized voltage responsive to connection of said a second at least one electrically powered load.

13. The device defined in claim 12, wherein said second at least one electrically powered load is connected in response to operation of said ignition system to start said vehicle.

14. The device defined in claim 1, wherein said automatic reset means comprises means for sensing operation of said ignition system to start said vehicle.

15. The device defined in claim 1, wherein said automatic reset means comprises means for applying a relatively small test signal to said first at least one electrically powered load, and means for sensing a change in said test signal that occurs upon connection of said second at least one load.

16. The device defined in claim 15, wherein said second at least one load is connected in response to operation of said ignition system to start said vehicle.

17. The device defined in claim 1, wherein said means for sensing comprises a comparator circuit having a first input connected to said battery and having a second input, a threshold reference circuit connected to said second input for establishing a reference voltage level, detection means responsive to said comparator for generating said sensing means output signal, and hysteresis means responsive to said timing output signal for providing a lowered voltage at said first comparator input.

18. The device defined in claim 17, wherein said automatic reset means comprises a test generator for generating a test signal, means for applying said test signal to said first at least one electrically powered load, whereby rapid variation of the voltage across said first at least one electrically powered load will vary said test signal, and comparison means responsive to variation of said test signal for decreasing the threshold level provided by said threshold circuit to said second comparator circuit input.

19. The device defined in claim 18, wherein said test generator comprises a current controlling device connected across said main switch between said battery and said first at least one electrically powered load, and negative feedback means responsive to said test signal for stabilizing the magnitude of said test signal.

20. For use in conjunction with an engine system having a battery, an ignition system, and a first at least one electrically powered load connected to the battery, a device adapted to electrically disconnect the battery from the first at least one load whenever the battery energy falls below a predetermined value and to automatically connect the battery to the first at least one load, said device comprising:

a normally closed main switch for connection between a battery and the first at least one load;

means for sensing an electrical battery characteristic indicative of battery drain and for generating an output signal whenever an energy capacity of said battery falls below a predetermined value; p1 timing means responsive to said sensing means output signal for generating a timing output signal a delay interval after said sensing means output signal;

means responsive to said timing means output signal for opening said main switch; and automatic reset means for closing said main switch, said automatic reset means responsive to sensing changes in voltage across said first at least one load.

21. The device defined in claim 20, wherein said device is adapted to be located entirely within the battery or with a housing adapted to be supported by the battery.

22. The device defined in claim 29, wherein said predetermined value is approximately seventy present of the voltage provided in a fully-charged battery.

23. The device defined in claim 20, wherein said battery comprises a lead-acid battery and said predetermined value is approximately 12.24 volts.

24. The device defined in claim 20, wherein said delay interval is a time greater than the time normally required to start said vehicle by operation of said ignition system.

25. The device defined in claim 20, wherein said first at least one load is connected in response to operation of said ignition system.

26. The device defined in claim 20, wherein said means for sensing comprises threshold means for establishing a threshold potential, means for sensing battery voltage, and means for comparing sensed battery voltage to said threshold potential, said reset means comprising means responsive to a decrease in voltage across said circuit means for relatively lowering said threshold potential with respect to sensed battery voltage.

27. The device defined in claim 20, further including hysteresis means responsive to said timing output signal for maintaining said timing output signal when said battery voltage rises above said selected level after said main switch is opened.

28. The device defined in claim 28, further including hysteresis means responsive to said timing output signal for causing said sensing means to generate said sensing means output signal when said battery voltage recovers to rise above said predetermined level, whereby the timing output signal remains when the battery voltage increases upon opening of said main switch.

29. The device defined in claim 20, wherein said means for sensing comprises means for generating a second battery voltage signal, and further comprising hysteresis means for lowering said sensed battery voltage signal in response to said sensing means output signal.

30. The device defined in claim 20, further including means for inhibiting said reset means for a predetermined time after generation of said sensing means output signal.

31. The device defined in claim 20, wherein said automatic reset means comprises means for applying a relatively stabilized voltage to said first at least one electrically powered load, and means for sensing a change in said stabilized voltage responsive to connection of a second at least one electrically powered load.

32. The device defined in claim 31, wherein said second at least one electrically powered load is connected in response to operation of said ignition system to start said vehicle.

33. The device defined in claim 20, wherein said automatic reset means comprises means for sensing operation of said ignition system to start said vehicle.

34. The device defined in claim 20, wherein said automatic reset means comprises means for applying a relatively small test signal to said first at least one electrically powered load, and means for sensing a change in said test signal that occurs upon connection of a second at least one electrically powered load.

35. The device defined in claim 34, wherein said second at least one electrically powered load is connected in response to operation of said ignition system to start said vehicle.

36. The device defined in claim 20, wherein said means for sensing comprises a comparator circuit having a first input connected to said battery and having a second input, a threshold reference circuit connected to said second input for establishing a reference voltage level, detection means responsive to said comparator for generating said sensing means output signal, and hysteresis means responsive to said timing output signal for providing a lowered voltage at said first comparator input.

37. The device defined in claim 36, wherein said automatic reset means comprises a test generator for generating a test signal, means for applying said test signal to said first at least one load, whereby rapid variation of the voltage across said load will vary said test signal, and comparison means responsive to variation of said test signal for decreasing the threshold level provided by said threshold circuit to said second comparator circuit input.

38. The device defined in claim 37, wherein said test generator comprises a current controlling device connected across said main switch between said battery and said first at least one load, and negative feedback means responsive to said test signal for stabilizing the magnitude of said test signal.

39. For use in conjunction with an engine system having a battery, an ignition system, and at least one electrically powered load connected to the battery, a device adapted to electrically disconnect the battery from the at least one load whenever the battery energy falls below a predetermined value and to automatically connect the battery to the at least one load, said device comprising:

a normally closed main switch for connection between a battery and the at least one load;

means for sensing an electrical battery characteristic indicative of battery drain and for generating an output signal whenever an energy capacity of said battery falls below a predetermined value;

timing means responsive to said sensing means output signal for generating a timing output signal a delay interval after said sensing means output signal;

means responsive to said timing means output signal for opening said main switch;

means for continuously monitoring the voltage across said at least one electrically powered load during at least a part of the time when said main switch is open; and automatic reset means for closing said main switch, said automatic reset means responsive to sensing changes in voltages across said at least one electrically powered load.

* * * * *

UNITED STATES PATENT AND TRADEMARK OFFICE
CERTIFICATE OF CORRECTION

PATENT NO. : 5,200,877
DATED : April 6, 1993
INVENTOR(S) : Arnold L. Betton et al.

It is certified that error appears in the above-indentified patent and that said Letters Patent is hereby corrected as shown below:

Column 6, line 52, please delete "LA16g-32-4" and substitute therefor --LA16g-324--.

Column 10, line 9, please delete "46" and substitute therefor --48--.

Column 15, claim 20, line 14, delete "pl".

Column 16:
Claim 20, line 14, please delete "pl".

Claim 21, line 3, please delete "with" and substitute therefor --within--.

Claim 22, line 1, please delete "29" and substitute therefor --20--.

Claim 28, line 1, please delete "28" and substitute therefor --20--.

UNITED STATES PATENT AND TRADEMARK OFFICE
CERTIFICATE OF CORRECTION

PATENT NO. : 5,200,877
DATED : April 6, 1993
INVENTOR(S) : Arnold L. Betton et al.

It is certified that error appears in the above-indentified patent and that said Letters Patent is hereby corrected as shown below:

```
Column 16, claim 29, line 3, delete "second" and insert --sensed--.
```

Signed and Sealed this

Twenty-sixth Day of December, 1995

Attest:

BRUCE LEHMAN

*Attesting Officer*     *Commissioner of Patents and Trademarks*